United States Patent [19]

Trueba et al.

[11] Patent Number: 4,882,595

[45] Date of Patent: Nov. 21, 1989

[54] HYDRAULICALLY TUNED CHANNEL ARCHITECTURE

[75] Inventors: Kenneth E. Trueba; William R. Knight; Niels J. Nielsen, all of Corvallis, Oreg.

[73] Assignee: Hewlett-Packard Company, Palo Alto, Calif.

[21] Appl. No.: 303,378

[22] Filed: Jan. 25, 1989

Related U.S. Application Data

[63] Continuation-in-part of Ser. No. 115,498, Oct. 30, 1987, abandoned.

[51] Int. Cl.[4] .......... G01D 15/16; B41J 3/04

[52] U.S. Cl. .......... 346/140 R

[58] Field of Search .......... 346/140

[56] References Cited

U.S. PATENT DOCUMENTS

| | | | |
|---|---|---|---|
| 4,216,477 | 8/1980 | Matsuda | 346/140 |
| 4,312,009 | 1/1982 | Lange | 346/140 |
| 4,317,124 | 2/1982 | Shirato | 346/140 |
| 4,490,728 | 12/1984 | Vaught | 346/140 X |
| 4,746,935 | 5/1988 | Allen | 346/140 |

FOREIGN PATENT DOCUMENTS

| | | |
|---|---|---|
| 100169 | 7/1980 | Japan . |
| 37438 | 2/1986 | Japan . |

*Primary Examiner*—Joseph W. Hartary
*Attorney, Agent, or Firm*—William J. Bethurum

[57] ABSTRACT

The use of lumped resistive elements (28) in an ink feed channel (10) between an ink-propelling element, such as a resistor, (12) and an ink supply plenum (14) provides a means of achieving resistive decoupling and meniscus resonance control with a minimum of deleterious side effects and design compromises typical of prior art solutions. A secondary constriction (30) in the ink feed channel is defined by a width $W_2$ sufficient to provide physical support for the resistive elements while avoiding resistance to ink refill. The printhead further comprises lead-in lobes (38) for assisting in purging any bubbles in the ink. The lobes are disposed between the projections and the plenum chamber and separate one pair of projections from a neighboring pair.

16 Claims, 4 Drawing Sheets

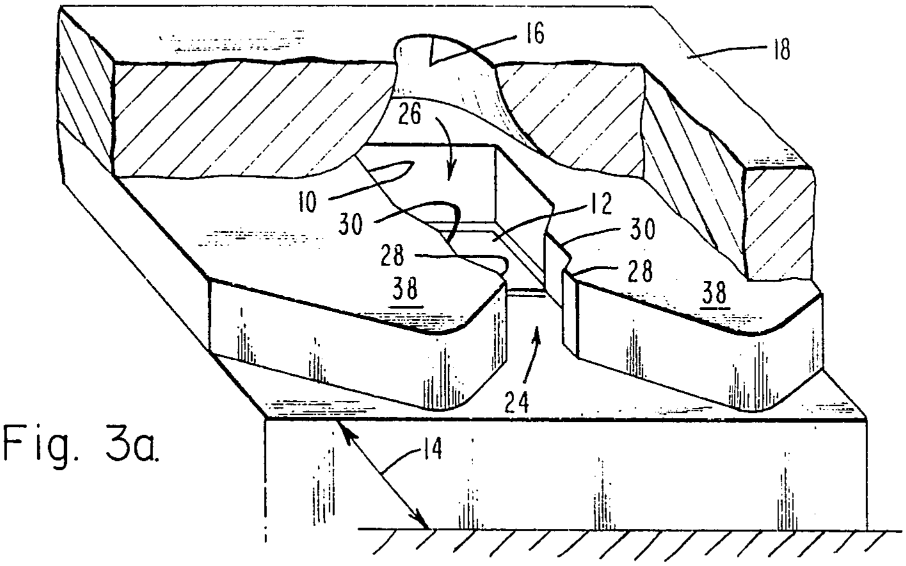
Fig. 3a.
Fig. 3b.
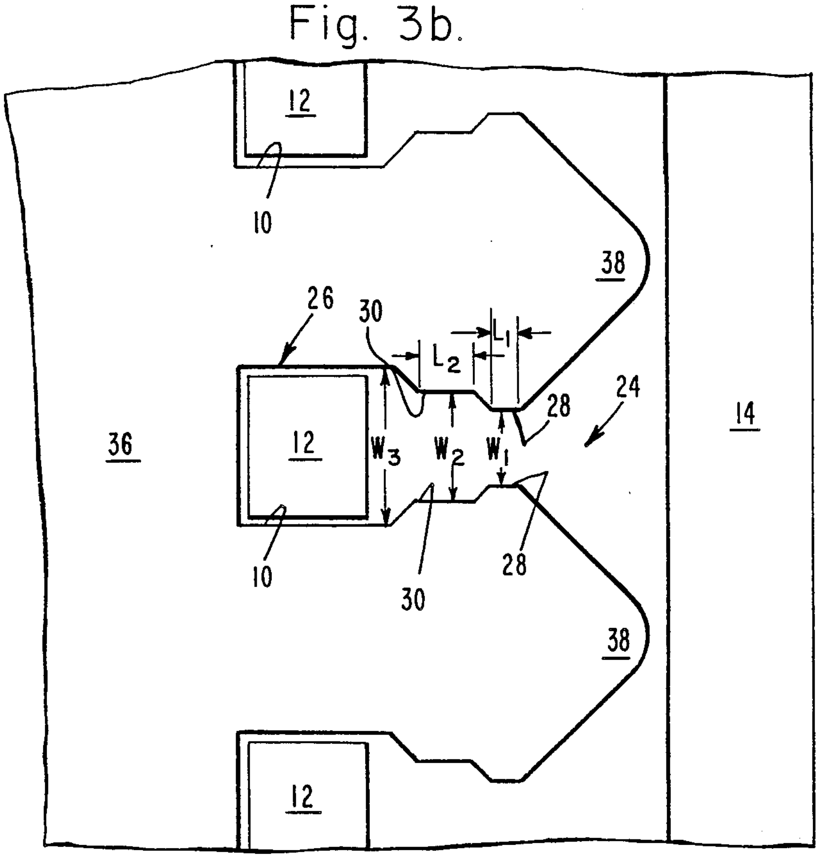

HYDRAULICALLY TUNED CHANNEL ARCHITECTURE

CROSS-REFERENCE TO RELATED APPLICATION

The present application is a continuation-in-part application of Ser. No. 07/115,498, filed Oct. 30, 1987, now abandoned.

TECHNICAL FIELD

The present invention relates to ink-jet printers, and, more particularly, to a structure for controlling fluid refill of firing chambers, minimizing meniscus travel and minimizing cross-talk between adjacent nozzles in the printhead used to fire droplets of ink toward a print medium.

BACKGROUND ART

When designing printheads containing a plurality of ink-ejecting nozzles in a densely packed array, it is necessary to provide some means of isolating the dynamics of any given nozzle from its neighbors, or else cross-talk will occur between the nozzles as they fire droplets of ink from elements associated with the nozzles. This cross-talk seriously degrades print quality and hence any providently designed ink-jet printhead must include some features to accomplish decoupling between the nozzles and the common ink supply plenum so that the plenum does not supply a cross-talk path between neighboring nozzles.

Further, when an ink-jet printhead is called upon to discharge ink droplets at a very high rate, the motion of the meniscus present in each nozzle must be carefully controlled so as to prevent any oscillation or "ringing" of the meniscus caused by refill dynamics from interfering with the ejection of subsequently fired droplets. Ordinarily, the "setting time" required between firing sets a limit on the maximum repetition rate at which the nozzle can operate. If an ink droplet is fired from a nozzle too soon after the previous firing, the ringing of the meniscus modulates the quantity of ink in the second droplet out. In the case where the meniscus has "overshot" its equilibrium position, a firing superimposed on overshoot yields an unacceptably large ejected droplet. The opposite is true if the firing is superimposed on an undershoot condition: the ejected droplet is too small. Therefore, in order to enhance the maximum printing rate of an ink-jet printhead, it is necessary to include in its design some means for reducing meniscus oscillation so as to minimize the settling time between sequential firings of any one nozzle.

Previous approaches to the problem of cross-talk, or minimizing inter-nozzle coupling, can be separated into three classes: resistive, inertial, and capacitive. The following is a brief discussion of each method and a critique of the typical embodiments of these methods.

Resistive decoupling uses the fluid friction present in the ink feed channels as a means of dissipating the energy content of the cross-talk surges, thereby preventing the dynamics of any single meniscus from being strongly felt by its nearest neighbors. In the prior art, this is typically implemented by making the ink feed channels longer or smaller in cross-section than the main supply plenum. While these are simple solutions, they have several drawbacks. First, such solutions rely upon fluid motion to generate the pressure drops associated with the energy dissipation; as such, they can only attenuate the cross-talk surges, not completely block them. Thus, some cross-talk "leakages" will always be present. Second, any attempt to shut off cross-talk completely by these methods will necessarily restrict the refill rate of the nozzles, thereby compromising the maximum rate at which the printhead can print. Third, the resistive decoupling techniques as practiced in the prior art add to the inertia of the fluid refill channel, which has serious implications for the printhead performance (as will be explained at the end of the inertial decoupling exposition which follows shortly).

In capacitive decoupling, an extra hole is put in the nozzle plate above that point where the ink feed channel meets the ink supply plenum. Any pressure surges in the ink feed channel are transformed into displacements of the meniscus present in the extra hole (or "dummy nozzle"). In this way, the hole acts as an isolator for brief pressure pulses but does not interfere with refill flow. The location, size and shape of the isolator hole must be carefully chosen to derive the required degree of decoupling without allowing the hole to eject droplets of ink as if it were a nozzle. This method is extremely effective in preventing cross-talk (but can introduce problems with nozzle meniscus dynamics, as will be discussed below).

In inertial decoupling, the feed channels are made as long and slender as possible, thereby maximizing the inertial aspect of the fluid entrained within them. The inertia of the fluid "clamps" its ability to respond to cross-talk surges in proportion to the suddenness of the surge and thereby inhibits the transmission of cross-talk pulses into or out of the ink feed channel. While this decoupling scheme is used in the prior art, it requires considerable area ("real estate") within the print head to implement, making a compact structure impossible. Furthermore, since the resistive component of a pipe having a rectangular cross-section scales directly with length and inversely with the third power of the smaller of the two cross-section dimensions, the flow resistance can grow to an unacceptable level, compromising refill speed. More importantly, however, are the dynamic effects caused by the coupling of this inertance to the compliance of the nozzle meniscus, as will be discussed below.

With regard to the problem of meniscus dynamics, there are apparently no solutions offered in the prior art. Apparently, this is a problem that has only recently surfaced as printhead designs have been pushed to accommodate higher and higher repetition rates. Clearly, any method used to decouple the dynamics of neighboring nozzles will also aid in damping out meniscus oscillations, at least from a superficial consideration. In practice, problems are experienced when trying to use the decoupling means as the oscillatory damping means. These problems can be traced to the synergistic effects between the nozzle meniscus and the fluid entrained within the ink feed channel, as outlined below.

If resistive decoupling is attempted by reducing the width of the entire ink feed channel, the inertia of the fluid entrained within the feed channel increases. When this inertia is coupled to the compliance of the meniscus in the nozzle, it results in a lower resonant frequency of oscillation of the meniscus, which requires a longer settling time between firings of the nozzle. The inertial effect and the resistive effect are hence deadlocked, with the net effect being that settling time cannot be reduced.

Capacitive decoupling has been proven effective at droplet ejection frequencies below that corresponding to the resonant frequency of the nozzle meniscus coupled to the feed channel inertia. However, its implementation at frequencies near meniscus resonance is also complicated by interactive effects. Specifically, the isolator orifice acts as a low impedance shunt path for high frequency surges. Hence, the high frequency impedance of an ink feed channel terminated at its plenum end with an isolator orifice will be lower than an equivalent channel without an isolator. This means that during the bubble growth phase, blow-back flow away from the nozzle is increased by the isolator orifice. This robs kinetic energy from the droplet emerging from the nozzle, which results in smaller droplet size and lower droplet velocities and thus lower ejection efficiency. During the bubble collapse phase, the isolator orifice meniscus pumps fluid flow back into the refill chamber, which excites a resonant mode in which the two menisci trade fluid between themselves via the ink feed channel. Since these two menisci are for most practical designs similar in size, and since they are effectively "in series", the equivalent compliance of the coupled system is roughly half of that with only one orifice in it. The two-orifice system will thus resonate at a higher frequency, which is a benefit from a settling time point of view, but the energy stored in the resonating system still needs to be dissipated and therefore constrictive damping will be necessary in such an implementation. While the effects of these resonances is poorly understood at this time, the efficiency decrease may be severe enough to prevent the printhead from working.

It is clear that what is needed is a printhead structure that accomplishes both (1) isolation of any given nozzle from its neighbors and (2) reduced oscillation of the meniscus caused by refill dynamics from interfering with the ejection of subsequently fired droplets, while limiting the severity of any side effects incurred in the implementation of the desired structure.

DISCLOSURE OF INVENTION

In accordance with the invention, a localized constriction (also referred to as a lumped resistance element) is introduced into entrance of the feed channel connecting each nozzle's firing chamber with the main ink supply plenum. The fact that the resistive aspect of each nozzle is localized permits these constrictions to be useful in cross-talk control, since the quantity of inertia they introduce into the feed channels is minimal. This overcomes the aforementioned problem of parasitic inertance present in the prior art in which the resistive aspect is distributed along, and thereby scales directly with, the length of the feed channel. The use of lumped resistance elements allows the printhead designer to vary the relative amounts of resistance and inertance present in the feed channel substantially independently of each other and thereby "tune" the feed channel for an optimum combination of inertance and resistance. An additional constriction is provided along the feed channel to support the constriction at the entrance thereof.

The lumped resistance element comprises a pinch point between two opposed projections in the ink feed side walls. Since these feed walls are commonly patterned in photoresist, the pinch points are easily implemented by including them in the photomask which defines the ink feed channel geometries. The degree of "pinch" possible is sensitively determined by the photochemical characteristics of the resist film. In practical terms, when using commercially common resist films and light sources, the ratio of film thickness (i.e., wall height) to pinch width ranges up to about 1.2.

The two opposed projections are not of sufficient strength alone to withstand the effects of fluid flowing into and out of the feed channel. Accordingly, the support constriction provides such support. The support constriction is achieved by employing a narrower width of the feed channel compared with the width of the firing chamber. This width must provide sufficient wall material to support the constrictions at the feed channel entrance, but not be narrow enough to add resistance to ink refill.

The novel printhead structure of the invention accomplishes both (1) isolation of any given nozzle from its neighbors, i.e., cross-talk reduction, and (2) reduced oscillation of the meniscus caused by refill dynamics in any individual nozzle. This prevents meniscus displacements from interfering with the ejection of subsequently fired droplets, while limiting the severity of any side effects incurred in the implementation of the desired structure. The new printhead structure has the additional advantage of being easy to implement and easy to "tune" for maximum effectiveness. This structure is directly applicable across the full range of ink-jet printheads.

BRIEF DESCRIPTION OF THE DRAWINGS

FIG. 3*a* is a perspective view of a resistor and ink feed channel configuration in accordance with the invention;

FIG. 3*b* is a top plan view of the configuration depicted in FIG. 3*a;*

BEST MODES FOR CARRYING OUT THE INVENTION

Figure 1:
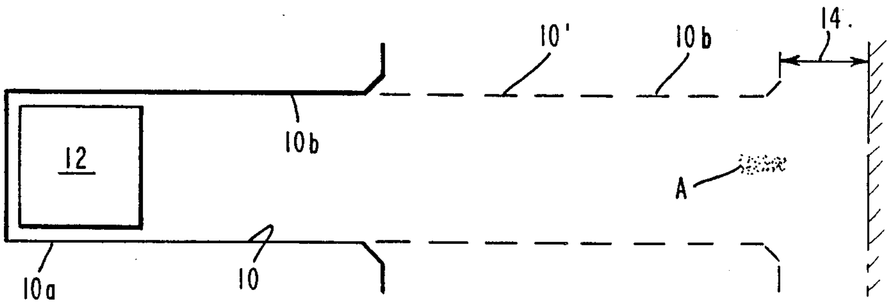
Fig. 1. (PRIOR ART)
FIG. 1 is a top plan view of a prior art resistor and ink feed channel configuration.

Referring now to the drawings wherein like numerals of reference designate like elements throughout, an ink feed channel 10 is shown, with a resistor 12 situated at one end 10*a* thereof. Ink (not shown) is introduced at the opposite end 10*b* thereof, as indicated by arrow "A", from a plenum, indicated generally at 14. Associated with the resistor is a nozzle, or convergent bore, 16 (such as seen in FIG. 3*a*), located above the resistor 12 in a nozzle plate 18. Droplets of ink are ejected through the nozzle (i.e., normal to the plane of FIG. 1) upon heating of a quantity of ink by the resistor 12.

While the invention is preferably directed to improving the operation of thermal ink-jet printheads, which employ resistors 12 as elements used to propel droplets of ink toward a print medium, such as paper, it will be appreciated by the person skilled in this art that the teachings of the invention are suitably employed to improve the operation of ink-jet printheads in general. Examples of other types of ink-jet printheads benefited by the teachings of the invention include piezoelectric, which employ a piezoelectric element to propel droplets of ink toward the print medium.

Attempts to minimize cross-talk between adjacent nozzles have included lengthening the channel 10, as shown by the dotted lines 10'.

Figure 2:
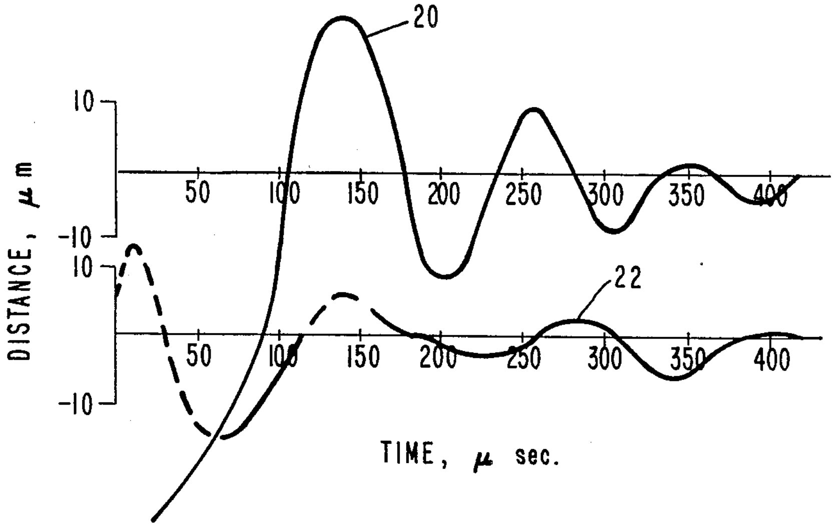
Fig. 2. (PRIOR ART)
FIG. 2, on coordinates of distance in μm and time in μsec, is a plot of meniscus damping of an active nozzle and an adjacent nozzle for the prior art configuration of FIG. 1.

The straight channel 10 does not permit facile damping of the ink. As seen in FIG. 2, damping of the meniscus of ink in the active nozzle takes more than 400 μsec (Curve 20). Simultaneously, the meniscus of ink in a neighboring nozzle is adversely affected by the action of the meniscus of ink in the active nozzle (Curve 22).

In accordance with the invention, a localized constriction 24 (also referred to as a lumped resistance element) is introduced into the feed channel connecting each nozzle's firing chamber 26 with the main ink supply plenum 14. The localized constriction 24 comprises a pair of opposed projections 28. In addition, a secondary constriction 30, between the localized constriction 24 and the firing chamber 26, is present in order to physically support the localized constriction.

Figure 4:
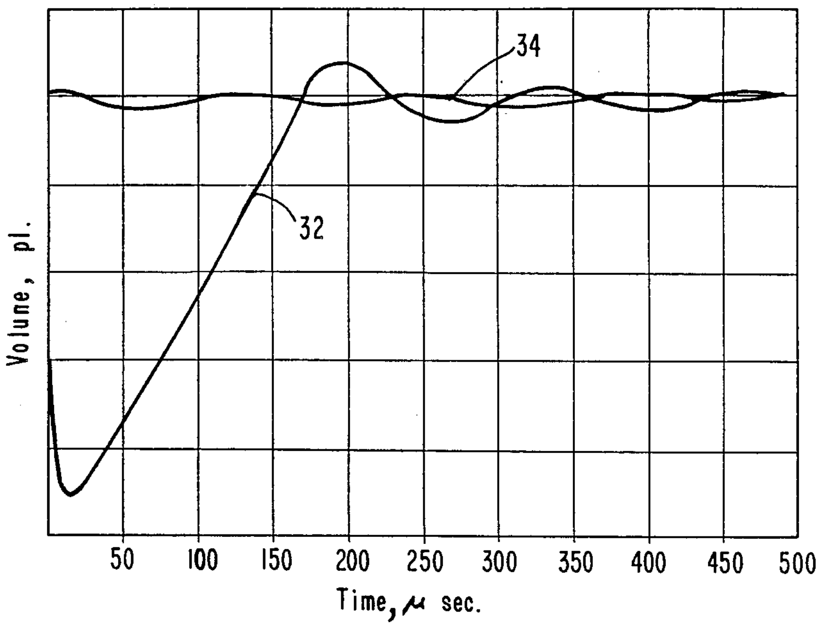
FIG. 4, on coordinates of volume in pl and time in μsec, is a plot of meniscus damping of an active nozzle and an adjacent nozzle for the configuration depicted in FIGS. 3*a–c;*

The use of opposed projections 28 in conjunction with the secondary constriction 30 considerably improves the damping of the fluid motions as seen in FIG. 4. Damping of the meniscus of ink occurs in about 250 μsec (Curve 32). Simultaneously, the fluid meniscus in a neighboring nozzle is hardly affected by the action of the meniscus of the active nozzle (Curve 34).

Preferably, the length of the channel 10 ranges from close to the resistor to about 65 μm. The height of the channel 10 ranges from about 15 to 30 μm. The resistor 12 is surrounded on three sides by a barrier 36 which defines the firing chamber 26. The three sides of the barrier 36 are spaced about 2 to 10 μm from the edge of the resistor 12.

Figure 5A:
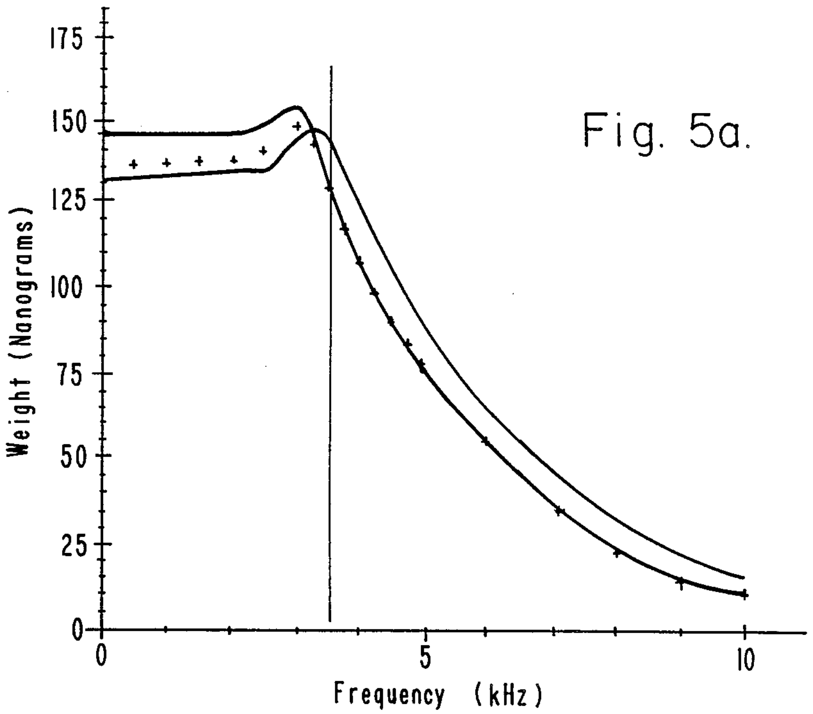
FIG. 5*a*, on coordinates of weight in nanograms and printing frequency in kHz, is a plot of the minimum and maximum amount of ink refilled in the pen at a constriction spacing of 25 μm.

For ink having a viscosity of 1.3 cp, the primary projections 28 of the constriction 24 are spaced ($W_1$) about 35 μm apart. The spacing could be somewhat narrower, although as seen in FIG. 5*a*, a spacing of 25 μm is too narrow, and as a result, pen refill is too slow. On the other hand, while the spacing could be somewhat greater than 35 μm, overshoot occurs. Under the above-mentioned conditions, overshoot becomes an important consideration at a spacing of about 50 μm. Thus, it will be appreciated that several factors govern the spacing between the projections 28, and that these factors, many of which are competing, must be balanced.

Some of the considerations that govern the channel dimensions relate to the amount of ink that has to be replaced after each firing. This amount is the sum of the quantity of ink that is ejected out through the nozzle 16 plus the quantity of ink that moves back through the feed channel. The latter quantity is referred to as the blowback, and is desirably as small as possible.

To get maximum performance, fast refill time in conjunction with avoiding having to overcome blow-back in the ink feed channel 10 is required. While a refill time of 0 μsec with very fast damping (no oscillation) is ideal, it is not possible. Refill times of about 250 μsec and less are found to provide adequate results at a frequency of 4 kHz. For a pen operating at 6 kHz, the corresponding acceptable refill time is about 167 μsec and less.

The tradeoff is that increased damping implies a slower refill. Since it is desired to maximize both refill and damping, optimizing them is the only possibility.

The shape of the projections 28 in the area of the opening 10*a* can contribute to the optimization of refill and damping. Specifically, the projections can be sharp, as seen in FIG. 3*b*, or rounded. The radius of the rounding may range from about 5 to 10 μm.

The configuration of the projections 28 affects turbulent flow of the ink in the vicinity thereof. In particular, sharper corners increase the turbulence, thus leading to higher resistance, in the ink feed channel 10 during the bubble growth phase. This reduces blow-back and decreases refill time.

Sharp corners are difficult to define lithographically in some resists, such as DuPont's Vacrel. However, other resists, such as the polyimides, may permit better definition.

The shape of the projections 28 is less important if lead-in lobes 38 are employed. Such lead-ins prevent bubbles in the ink from residing in the plenum area and act to guide any such bubbles into the firing chamber 26, where they are purged during firing.

The width $W_2$ and length of the feed channel provided by the secondary constriction 30 are constrained by two considerations. It must be of sufficient dimensions to prevent resistance to ink refill, while at the same time providing physical support to the projections 24.

The length of the secondary constriction 30 must be such as to avoid encroachment on the ink bubble being formed on the resistor 12 during firing. Such encroachment could result in the entraining of air bubbles into the firing chamber 26 during coalescence and thereby adversely affect the operation of the printhead.

Advantageously, the width $W_2$ of the secondary constriction is about 40 to 60% of the difference between the width $W_3$ of the firing chamber and the width $W_1$ between the opposed projections 28 plus the width of the opposed projections.

For a firing chamber 26 having a width $W_3$ of about 60 μm and for projections 28 spaced apart by 35 μm ($W_1$), a width $W_2$ of the feed channel therebetween of about 40 to 60 μm, and preferably about 50 μm, and a length of about 20 to 40 μm, and preferably about 30 μm, is sufficient to accomplish both considerations.

The constricted feed channel of the invention can be introduced into the printhead architecture without lengthening the overall feed channel structure and without revising the orifice plate 18 with the addition of isolator orifices.

The mass "seen" by the nozzle meniscus as it oscillates is predominantly the fluid mass in the firing chamber. The resistance of the ink feed channel of the invention decouples this mass from the ink in the common plenum.

Figure 3C:
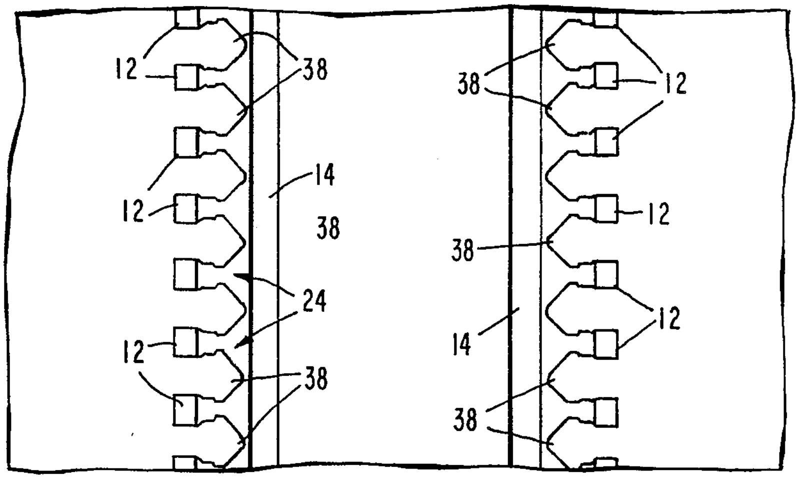
FIG. 3*c* is a top plan view of a portion of a printhead, showing a plurality of the configurations depicted in FIG. 3*b;*

FIG. 3*c* depicts a plurality of firing chambers 26 in which the ink feed channel 10 is provided with a pair of channel constrictions 28, 30. It is seen that a common plenum 14 provides an ink supply to each firing chamber.

INDUSTRIAL APPLICABILITY

The use of lumped resistive elements in the ink feed channel to allow independent adjustment of the feed channel's resistive and inertial parameters is useful in ink-jet printer applications based on thermal and non-thermal ink-jet technologies.

EXAMPLES

A comparison was made between a straight ink feed channel of the type depicted in FIG. 1 (prior art) and an ink feed channel of the invention as depicted in FIGS. 3*a–c.* In each case, the resistor was 60 μm×60 μm square. In the prior art case ("straight"), the ink feed channel was 150 μm long and 70 μm wide. In the configuration of the invention ("opposed projection"), the ink feed channel was 50 μm long (from the edge of the resistor to the opening to the reservoir) and had projections 28 affording an opening of 35 μm wide ($W_1$). The secondary constriction 30 was 50 μm wide ($W_2$) and was 30 μm in length between the projections and the firing chamber 26. The firing chamber was 70 μm×70 μm square.

In the comparison, for a given drop size (in picoliters, pl), the refill time (in microseconds, μsec) and the overshoot volume (in pl) and the blow-back volume (in pl) were calculated. The results are shown in Table I below.

TABLE I

| Barrier Type | Drop Size, pl | Refill Time, μsec | Overshoot Vol., pl | Blow-back Vol., pl |
|---|---|---|---|---|
| Straight | 75 | 130 | 36 | 75 |
| | 150 | 242 | 38 | 232 |
| Opp. | 75 | 135 | 16 | 40 |
| Proj. | 100 | 150 | 16 | 48 |
| | 150 | 156 | 16 | 78 |

Table I shows that the opposed projection configuration of the invention works because the blow-back volume is held in check. The straight barrier with 150 pl drop actually has to refill 382 pl because of the excessive amount of blow-back.

In another example, the $W_1$ and $L_1$ dimensions, depicted in FIG. 3*b,* were varied. The projections all had 5 μm radius (R) rounded corners. The drop volume was 150 pl in all cases. The results are shown in Table II.

TABLE II

| L, μm | W, μm | Refill Time, μsec | Overshoot Volume, pl | Blow-back Volume, pl |
|---|---|---|---|---|
| 4 | 22 | 178 | 11 | 71 |
| 4 | 26 | 172 | 16 | 85 |
| 4 | 30 | 174 | 20 | 94 |
| 4 | 34 | 182 | 24 | 104 |
| 4 | 38 | 200 | 27 | 127 |
| 4 | 42 | 212 | 29 | 150 |
| 4 | 30 | 174 | 20 | 94 |
| 8 | 30 | 184 | 19 | 91 |
| 12 | 30 | 194 | 18 | 89 |
| 16 | 30 | 209 | 17 | 92 |

From the foregoing data, it appears that the dominant contributor to fast refill is the width $W_1$ provided by the opposed projections, or the amount of constriction. The length $L_2$ of the straight section should be held to a minimum, consistent with providing support of the opposed projections 28, since increased length does slow refill.

A study was also made of opposed projections with sharp corners and opposed projections with 5 μm radius rounded corners. The refill time was found to be 20 μsec shorter for the sharp corner configuration, but the blow-back volume was 3 pl less. Of the 20 μsec speed-up, some may be attributed to the reduction down to zero of the equivalent straight pipe section inherent in the rounded corners.

Figure 5B:
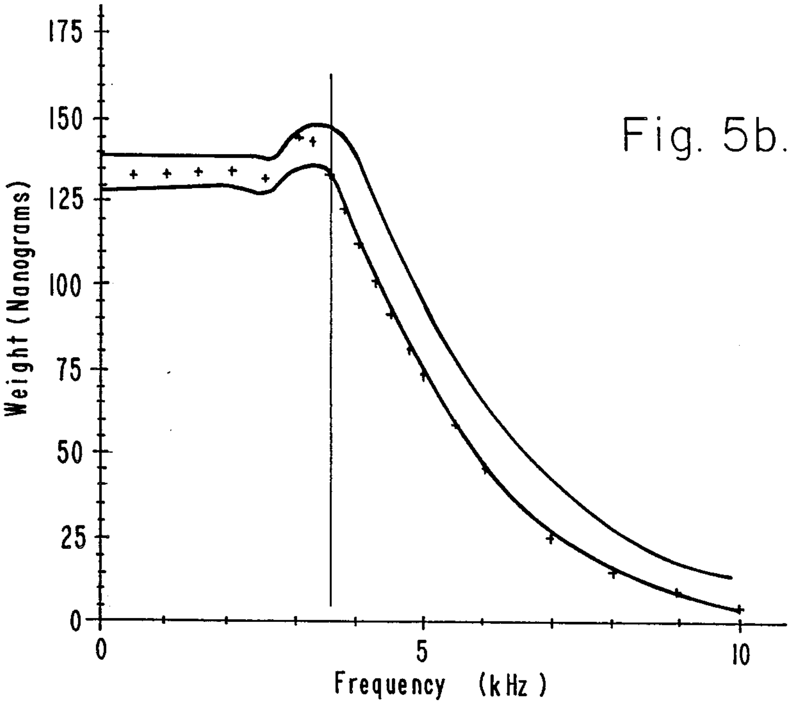
FIG. 5*b* is a plot similar to that of FIG. 5*a*, but at a constriction spacing of 35 μm.

With regard to spacing between the projections 28 ($W_1$), FIG. 5 depicts the importance of employing a spacing of sufficient width to avoid refill problems. The plots are drop weight frequency response curves, each curve representing the results of a batch of pens, each pen provided with a printhead having a plurality of nozzles. In FIG. 5*a,* the spacing is 25 μm, while in FIG. 5*b,* the spacing is 35 μm.

At low operating frequencies, there is a steady state at which meniscus dynamics do not modulate drop volume (mass) that is achieved at a given frequency. At higher frequencies, the steady state condition is lost after the ejection of the first droplet as the position of the meniscus in the nozzle modulates the quantity of ink available for the next firing. Drop mass first decreases, representing meniscus undershoot, then increases to a maximum, or peak, value, representing meniscus overshoot, and finally tails off, representing complete refill of the firing chamber and restoration of steady state conditions in the nozzle. The curves in FIG. 5 hence represent the position of the meniscus during the refill portion of the printhead's operating cycle. The right-hand, sloping portion of the curves represent the result of firing a second droplet when the meniscus is deeply retracted into the firing chamber. Refill is incomplete and a droplet mass deficit results. The peak or "hump" occurs when the second droplet is fired atop an overshoot meniscus, which overloads the firing chamber with ink and yields a surfeit of ink in the ejected droplet. The small trough similarly reflects the rebound of the meniscus through an undershoot as it eventually settles down to its steady state position.

The vertical line at 3.6 kHz represents the operating frequency of the printhead. For the 25 μm spaced projections (FIG. 5*a*), the pens are seen to be in the refill phase, which means that there is insufficient ink to fire at the appropriate time. For the 35 μm spaced projections (FIG. 5*b*), the pens are seen to be in the overshoot phase, which is acceptable when operating at as high a frequency as possible.

Thus, a feed channel architecture, comprising a pair of opposed projections and a narrow feed channel relative to the firing chamber is provided for an ink-jet pen for use in thermal ink-jet printers. It will be clear to one of ordinary skill in the art that various changes and modifications of an obvious nature may be made without departing from the spirit of the invention, and all such changes and modifications are deemed to fall within the scope of the invention as defined by the appended claims.

What is claimed is:

1. An improved ink-jet printhead including a plurality of ink-propelling elements (12), each ink-propelling element disposed in a separate firing chamber (26) defined by three barrier walls (36) and a fourth side open to a reservoir of ink common to at least some of said elements, and a plurality of nozzles (16) comprising orifices disposed in a cover plate above said elements, each orifice associated with an element for firing a quantity of ink (A) normal to the plane defined by each said element and through said orifices toward a print medium in defined patterns to form alphanumeric characters and graphics thereon, wherein ink is supplied to said element from a plenum chamber (14) by means of an ink feed channel (10), wherein the improvement comprises:

(a) a pair of opposed projections (28) formed in walls in said ink feed channel and separated by a first width ($W_1$) to cause a first constriction between said plenum and said channel; and (b) a second constriction (30) along the length of said ink feed channel defined by a second width ($W_2$) between said walls of said ink feed channel, said second width narrow than the width of said firing chamber and wider than said first width between said opposed projections and sufficient to physically support said projections without adversely adding to resistance to ink refill of said channel.

2. The printhead of claim 1 wherein said ink-propelling elements comprise resistive heating elements.

3. The printhead of claim 1 wherein said projections are sharp.

4. The printhead of claim 1 wherein said projections are round, with the radius of rounding ranging from about 5 to 10 μm.

5. The printhead of claim 1 wherein said second width of said secondary constriction is about 40 to 60% of the difference between said width of said firing chamber and said first width plus said first width.

6. The printhead of claim 1 wherein said first width is about 35 μm, said width of said firing chamber is about 70 μm, and said second width is about 40 to 60 μm and wherein the length of said secondary constriction is about 20 to 40 μm.

7. The printhead of claim 6 wherein said second width is about 50 μm and wherein the length of said secondary constriction is about 30 μm.

8. The printhead of claim 1 further comprising means (38) for assisting in purging any bubbles in said ink, said means disposed between said projections and said plenum chamber and separating one ink feed channel from a neighboring ink feed channel.

9. The printhead of claim 8 wherein said means for purging bubbles comprises a pair of lead-in lobes (38), one lobed disposed on either side of said ink feed channel.

10. An improved ink-jet printhead including a plurality of ink-propelling elements (12), each ink-propelling element disposed in a separate firing chamber (26) defined by three barrier walls (36) and a fourth side open to a reservoir of ink common to at least some of said elements, and a plurality of nozzles (16) comprising orifices disposed in a cover plate above said elements, each orifice associated with an element for firing a quantity of ink (A) normal to the plane defined by each said element and through said orifices toward a print medium in defined patterns to form alphanumeric characters and graphics thereon, wherein ink is supplied to said element from a plenum chamber (14) by means of an ink feed channel (10), wherein the improvement comprises:

(a) a pair of opposed projections (28) formed in walls in said ink feed channel and separated by a first width ($W_1$) to cause a first constriction between said plenum and said channel;

(b) a second constriction (30) along the length of said ink feed channel defined by a second width ($W_2$) between said walls of said ink feed channel, said second width narrow than the width of said firing chamber and wider than said first width between said opposed projections and sufficient to physically support said projections without adversely adding to resistance to ink refill of said channel; and (c) means (38) for assisting in purging any bubbles in said ink, said means comprising a pair of lead-in lobes disposed between said projections and said plenum chamber and separating one ink feed channel from a neighboring ink feed channel.

11. The printhead of claim 10 wherein said ink-propelling elements comprise resistive heating elements.

12. The printhead of claim 10 wherein said projections are sharp.

13. The printhead of claim 10 wherein said projections are round, with the radius of rounding ranging from about 5 to 10 μm.

14. The printhead of claim 10 wherein said second width of said secondary constriction is about 40 to 60% of the difference between said width of said firing chamber and said first width plus said first width.

15. The printhead of claim 10 wherein said first width is about 35 μm, said width of said firing chamber is about 70 μm, and said second width is about 40 to 60 μm and wherein the length of said secondary constriction is about 20 to 40 μm.

16. The printhead of claim 15 wherein said second width is about 50 μm and wherein the length of said secondary constriction is about 30 μm.

* * * * *